United States Patent [19]

Offenstadt

[11] 4,433,747

[45] Feb. 28, 1984

[54] MOTORCYCLE WITH IMPROVED REAR SUSPENSION

[75] Inventor: Eric Offenstadt, Pontoise, France

[73] Assignee: Sercati S.A.R.L., Paris, France

[21] Appl. No.: 325,873

[22] Filed: Nov. 30, 1981

[30] Foreign Application Priority Data

Dec. 1, 1980 [FR] France .................... 80 25479

[51] Int. Cl.³ .................................... B62K 25/02
[52] U.S. Cl. ........................... 180/227; 180/231; 280/284
[58] Field of Search ............ 180/227, 231; 280/284, 280/288; 192/3 H, 13 R

[56] References Cited

U.S. PATENT DOCUMENTS

| | | | |
|---|---|---|---|
| 1,075,886 | 10/1913 | White | 180/227 |
| 4,058,181 | 11/1977 | Buell | 180/227 |
| 4,061,050 | 12/1977 | Bolger | 180/231 |

FOREIGN PATENT DOCUMENTS

| | | | |
|---|---|---|---|
| 413744 | 5/1946 | Italy | 180/227 |
| 17438 | 11/1888 | United Kingdom | 280/284 |

Primary Examiner—John A. Pekar
Assistant Examiner—D. Lynn Fugate
Attorney, Agent, or Firm—James Creighton Wray

[57] ABSTRACT

The invention relates to motorcycles of the kind comprising a rear wheel axis carried by at least one suspension arm mounted for oscillations about a suspension travel axis, a resilient suspension member acting between a frame and the suspension arm, and a loop transmission connecting a driving pinion with a driven pinion solid with the rear axle. The technical problem is to provide such a motorcycle with greater suspension stability by under acceleration. In accordance with the invention, in the flat road running condition, the suspension travel axis is disposed in the same plane as the axes of the driving and driven pinions, in front of the driving pinion, so that transmission loop tension tends to reduce suspension excursions. The invention is applicable to chain drive and other loop drives.

13 Claims, 10 Drawing Figures

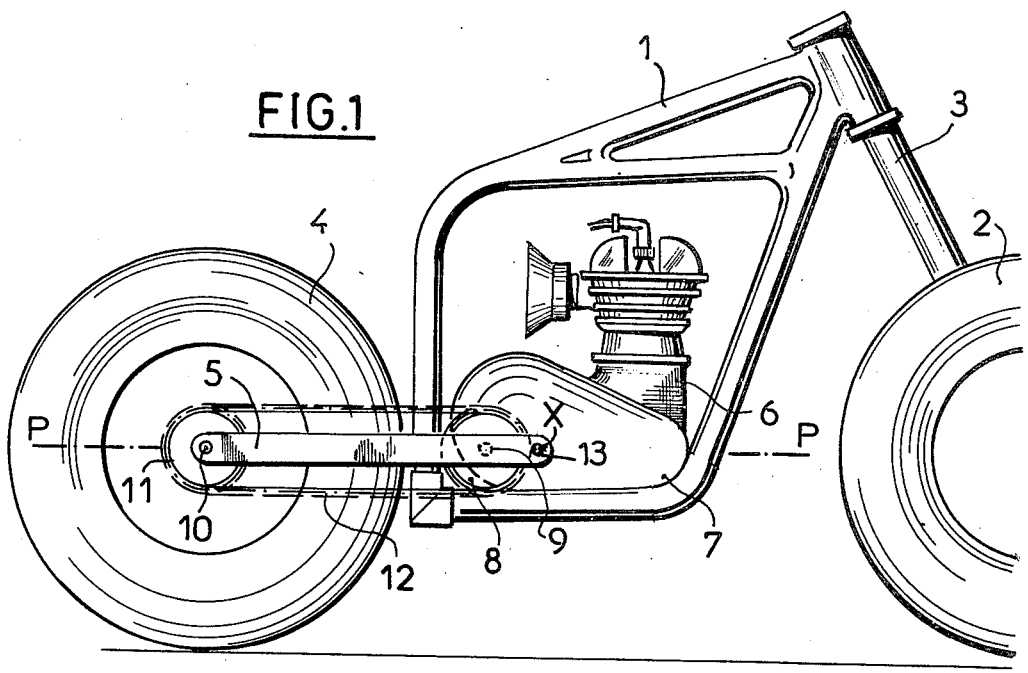
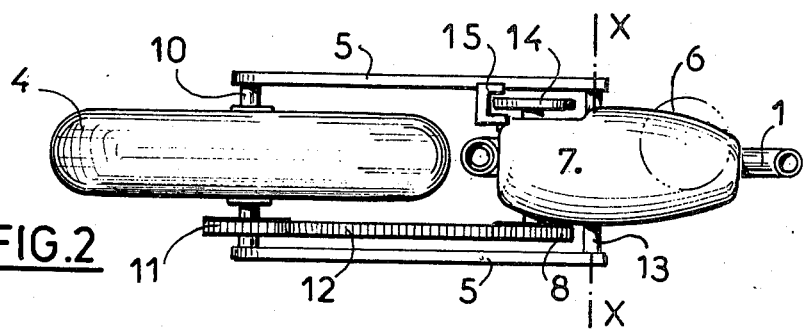
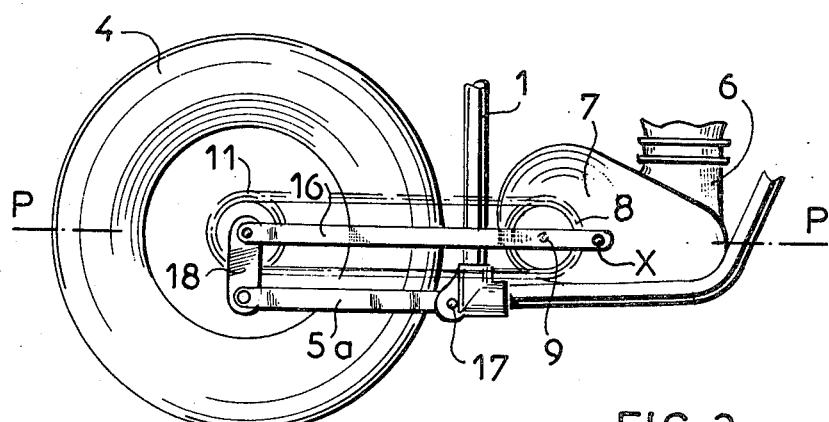

MOTORCYCLE WITH IMPROVED REAR SUSPENSION

The present invention relates to motorcycles of the kind comprising a rear road wheel axle carried by at least one suspension arm disposed at the side of the motorcycle and mounted for angular movement in a vertical longitudinal plane so as to define a corresponding oscillatory circular movement of the rear axle about a transverse geometrical axis which is fixed relative to the frame of the motorcycle, a suspension member acting between the suspension arm and the frame, and a flexible transmission member, such as a chain, connecting a driving pinion, connected to be driven by the motor, with a driven pinion, connected to drive the rear wheel. The driving pinion may be the output pinion of a gearbox driven by the motor.

In a previously known motorcycle of this kind, the geometrical axis of oscillation of the rear axle is disposed to the rear of the axis of the drive pinion.

This known arrangement presents two disadvantages. Firstly, during vertical movements of the rear wheel on bumps or hollows in the road surface, the rear wheel pivots about the geometrical suspension axis, which produces 'induced' supplementary accelerations or decelerations which may cause the wheel to slip on the ground, with consequential loss of adhesion and wheel bounce which are bad for road holding. Moreover, when the rear suspension of the motorcycle is compressed under acceleration, due to the reaction of the high center of gravity, the transmission tension accentuates the suspension compression, reducing the suspension efficiency, and tending to lift the rear wheel which is thus partially unloaded with a dangerous further reduction in adhesion.

The object of the present invention is to provide a motorcycle of the kind referred to in which the tendency to lose adhesion under acceleration is reduced.

To this end, the present invention provides a motorcycle of the kind referred to above characterized in that the geometrical axis of oscillation of this rear wheel, in the flat road steady running position of the suspension, is disposed generally in the plane defined by the rear axle and the axis of said driving pinion, and is disposed in front of said driving pinion.

With this arrangement, under acceleration, which tends to compress the rear suspension of the motorcycle, the tension in the upper stretch of the chain or other transmission member applies a force directed forwardly and downwardly to the driven pinion, and hence to the rear axle, the result of these two forces tending al- a force directed rearwardly and less downwardly to the rear axle, the resultant of these two forces tending always to realign the three axes, of the rear wheel, the driving pinion and the suspension oscillation, so as to bring the driving pinion axis back into line with the other two axes. The stability of the suspension system is thus improved, not only under acceleration, but also by symmetry under deceleration.

It is clear that, if the axis of oscillation coincided wih the driving pinion axis, no interaction of the kind described would occur. If, on the other hand, the oscillation axis is disposed in front or to the rear of the driving pinion axis, the interaction occurs, but when the oscillation axis is to the rear of the driving pinion axis, as in the prior art, the interaction is unfavorable, that is it decreases the stability of the suspension system by accentuating the initial compression or extension of the rear suspension, while if the oscillation axis is in front, as in the present invention, it tends to increase the suspension system stability.

On currently available motorcycles, the suspension oscillation axis is mostly disposed to the rear of the driving pinion axis, or at most, in some cases, in the same fore and aft plane. No case is known where the suspension oscillation axis has previously been positioned in front of the driving pinion axis.

With the present invention, the rear wheel loading is increased instead of being decreased by the transmission tension, which increases adhesion under acceleration and also the transmission tension tends to relieve the rear suspension under acceleration, which enables softer springing and damping to be used with consequent improvement in ride comfort.

In a first embodiment of the invention, where one end of the suspension arm carries the rear axle directly and the other end is mounted either directly on the frame or on a member fixed to the frame so that the oscillation axis of the suspension arm coincides with the oscillation axis of the rear axle, it is advantageously arranged that the common oscillation axis is disposed in the same plane as the rear axle and the driving pinion axis, in front of the driving pinion axis.

In a second embodiment of the invention, the suspension arm is disposed vertically above or below the generally horizontal plane containing the rear axle and the driving pinion axis, and is mounted at one end on the frame or on a member fixed to the frame, while its other end carries the rear axle through an articulated crank, and a connecting arm of reduced section and strength connects the rear axle with the geometrical oscillation axis of the rear axle and maintains the geometrical alignment of these two axes with the axis of the driving pinion. In this arrangement, the two functions, wheel support and geometrical alignment, which were both performed by the single suspension arm in the first embodiment, are separately performed by two separate members, that is to say the offset suspension arm for wheel support and the connecting arm for geometrical alignment. This arrangement is particularly advantageous because of the reduced space requirement of the connecting arm which is disposed in a part of the motorcycle where there is little space available and where, in this embodiment, the rider's feet can be placed closer together which is especially important for a competition motorcycle. Moreover the offset suspension arm can be made more rigid and shorter, which also reduces space requirements, it being understood that the suspension arm bears the thrust of the springing and damping means in the suspension system.

In a third embodiment of the invention, two suspension arms are advantageously provided on the same side of the motorcycle and are spaced apart vertically, with one above and the other below the generally horizontal plane containing the rear axle and the driving pinion axis, with both suspension arms generally parallel to this plane, one end of each arm being mounted for oscillation on the frame or a member fixed to the frame while the other ends of the two arms are connected by an articulated crank bearing the rear axle, the two suspension arms and the crank forming three sides of an articulated parallelogram whose fourth side, which joins the oscillation points of the two suspension arms on the frame, intersects the plane of the axes in a point defining the geometrical axis of rear axle oscillation disposed in front of the driving pinion axis. With this arrangement, the two functions of wheel support and geometrical alignment are again separated, the alignment function being purely geometrical in this case, as it no longer corresponds with the connecting arm which was provided in the second embodiment, so that even more space is liberated in the region of the driving pinion especially for the feet.

Preferably, in all three of the above mentioned embodiments, the driving pinion is advantageously formed by the gearbox output pinion, so that the rear axle oscillation axis is in front of the gearbox output pinion axis.

In a fourth embodiment of the invention, in the case where one end of the suspension arm carries the rear axle directly, while the other end is mounted for oscillation on the frame or on a member fixed to the frame, so that the rear axle oscillation axis coincides with the suspension arm pivot, the driving pinion advantageously comprises an idler wheel mounted on the frame for free rotation about an axis which is disposed in the same plane as the rear axle and the suspension oscillation axis, to the rear of the suspension oscillation axis, with the idler wheel connected by a further flexible transmission, such as a further chain, to the gearbox output pinion.

In a particularly advantageous arrangement, the rear driven pinion and the driving pinion have the same size, so that these two wheels no longer perform the role of demultiplication, even in the case where the driving pinion is the gearbox output pinion. In this way, the upper (or lower) stretch of the chain forms a practically undeformable parallelogram with the line joining the rear axle and the driving pinion axis, so that this stretch of chain remains substantially parallel to this line and of constant length independent of suspension travel, so as to reduce further the accelerations and decelerations induced by suspension geometry according to the invention. The risk of loss of adhesion due to induced road wheel accelerations on bumps is thus further reduced.

Equality of driving and driven pinion size enables a reduction in the size of the driven pinion relative to currently used diameters, giving better appearance, and especially also enables an increase in driving pinion size relative to current practice when this is the gearbox output pinion. In this case, it can preferably be arranged that the gearbox output shaft bearing the output wheel on one side of the gearbox, also carries on the same side or on the opposite side, a brake disc whose caliper is fixed to the frame or to the gearbox casing. This arrangement reduces the weight of the rear wheel, which normally has the rear brake, and thus reduces parasitic bounce and also wheel movement induced by braking. It is thus possible to provide a brake disc of diameter similar to that of the gearbox output pinion, which substantially reduces space requirements.

The use of driving and driven pinions of the same size reduces to zero the interactive forces in the transmission induced by suspension travel. By choosing a small diameter for these two wheels, the transmission can be enclosed in a small casing, which enables the transmission to be provided with an oil bath. The chain tension is inversely proportional to the chain pinion size; the use of two wheels of the size of the normal motor output pinion size would normally require demultiplication at the rear wheel (such as internal gearing meshing with the pinion wheel). Accordingly it is preferred to use two pinions of the same small diameter previously used for the gearbox output pinion. The provision of a transmission casing with an oil bath gives a reduction in noise levels, and an improved appearance. The casing can be made from plastics material and can be arranged to be maintenance-free.

In the different designs in accordance with the invention, it can be arranged that the suspension arm or arms and the connection arm are duplicated by similar arms on both sides of the motorcycle.

The flexible transmission element may be a chain or a toothed belt.

Other features and advantages of the invention will appear from the following description, by way of non-limitative example, with reference to the accompanying drawings, in which:

FIG. 1 represents a partial and diagrammatic side view of a motorcycle according to a first embodiment of the present invention, comprising a suspension arm at the usual height.

FIG. 2 is a partial and diagrammatic top view of the motorcycle of FIG. 1.

FIG. 3 represents a view corresponding to FIG. 1 of a second embodiment of the invention, with a suspension arm offset downwards.

Figure 4:
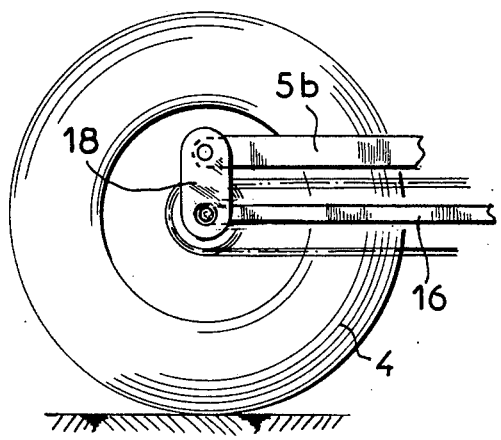
FIG. 4 is a similar view of a variant of the second embodiment of the invention, with a suspension arm offset upwards.

The motorcycle represented by FIGS. 1 and 2 comprises a frame 1 on which is mounted a front wheel 2, through a steering column 3, and also a rear wheel 4, through two suspension arms 5.

These two suspension arms are disposed one on the left and the other on the right of the motorcycle, for movement in respective vertical planes.

In addition, a motor 6 is fixed to the frame 1 and has a gearbox 7 solid with the lower part of the motor 6, the gearbox 7 resting on the lower part of the frame 1 and being fixed there to. This gearbox comprises an external output pinion 8 disposed on the right side of the gearbox, and forming a drive pinion for the transmission to the rear wheel.

The masses and dimensions of the different parts of the motorcycle are arranged so that when the motorcycle is at rest or in steady running on a flat road, the axis 9 of the pinion 8 is positioned in the same plane P—P as the axle 10 of the rear wheel 4. On the rear axle 10 a rear pinion 11 is also disposed, the pinion 11 is of the same size as the pinion 8 and is connected therewith by a transmission chain or toothed belt 12, the pinion 11 being disposed on the same right side of the wheel 4, of course. The plane P—P can be positioned between horizontal and an angle which can reach 30°, so that in this case the fixing point 13 of the arms 5 is situated above the horizontal plane through the rear axle 10.

The two suspension arms 5 are mounted at one end to the rear axle 10 and at the other end for oscillation about pivots 13 fixed on the gearbox 7, on each side thereof, on a common axis X—X. This axis X—X is disposed relative to the gearbox, and therefore relative to the frame 1 on which the gearbox is fixed at a position such that the axis X—X is disposed in the same plane P—P as the axes 9 and 10 of the gearbox output pinion 8 and the rear wheel pinion 11, in the unladen rest condition referred to.

An essential feature is that the pivots 13, that is to say the axis X—X of oscillation of the rear wheel 4 relative to the frame, are disposed in front of the axis 9 of the driving pinion for the rear wheel, formed by the output pinion 8.

Due to this arrangement, during acceleration, which tends to compress the rear suspension, that is to say tip the frame rear towards the ground, there is a force tending to realign the three axes 10, 9 and X—X into the plane P—P, which reduces the risk of loss of adhesion.

The aligned disposition in the plane P—P containing the axes 10, 9 and X—X, as referred to above is obtained advantageously not only by the choice of the masses and relative positions of the different parts, but also by special choice of the springing and damping suspension members (not shown in the drawings) which advantageously act between the frame 1 and the suspension arms 5.

A disc brake is also provided which is advantageously disposed on the opposite side of the gearbox to the transmission chain, in this case on the left side, this disc brake comprising a disc 14 on the end of the shaft 9 opposite the output pinion 8 and projecting from the left side of the gearbox, this disc 14 being at the same diameter as the output pinion 8, and a brake caliper 15 which is fixed on the gearbox housing itself and is disposed in the usual way embracing the periphery of the disc 14 like a jaw.

In the second embodiment shown in FIG. 3, the frame 1, the rear wheel 4 and the gearbox 7 have the same dispositions as before, whereas the two suspension arms 5 are replaced by two connecting arms 16 disposed in the same positions and having the same lengths as the arms 5 of FIG. 1, but having reduced section, given that, in the present embodiment, they only have to ensure the function of aligning the rear axle 10, the gearbox output pinion axis 9 and the axis X—X of oscillation of the rear wheel into the plane P—P. Those connecting arms do not need to present as great a strength nor rigidity and, due to their smaller section, they occupy less space, leaving more room for the rider's feet on the foot rests.

In addition, two suspension arms 5a are provided which have the same section as the previous arms 5, or greater section, so as to have at least as great rigidity, but are off-set vertically beneath the plane P—P, being pivoted at one end on the base of the frame 1 and being pivoted at the other end on cranks 18 which themselves are mounted to oscillate on the rear axle 10, this arrangement being such that the suspension arms 5a form with the connecting arms 16, the cranks 18 and the frame 1 a parallelogram maintaining the suspension arms parallel with the connecting arms.

The variant shown in FIG. 4 is similar to that of FIG. 3, except only that the suspension arms 5b are off-set upwards and not downwards from the connecting arms 16, their linking being also established by cranks 18.

Figure 5:
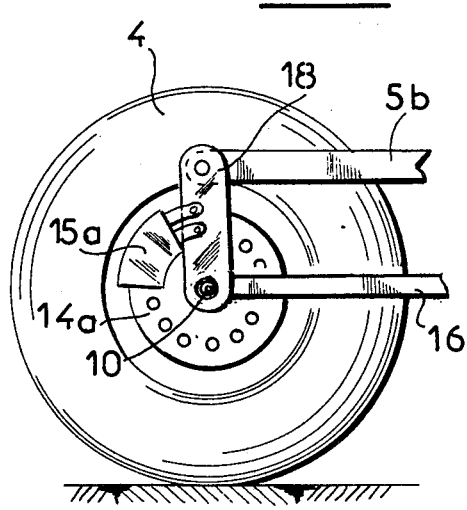
FIG. 5 shows the installation of a disc brake in an embodiment of the kind shown in FIG. 4.

While the disc brake 14–15 is mounted on the gearbox output shaft in the three structures described above, it can be arranged on the rear wheel itself in the usual way, as shown in FIG. 5, which has suspension arms 5b disposed above connecting arms 16, like FIG. 4, the disc 14 being of normal size (that is to say substantially bigger than the disc 14 shown in FIG. 2) and being fixed on the rear axle 10, while the brake caliper 15a is fixed by fixing brackets to the crank 18 disposed on the same side as the brake.

Figure 6:
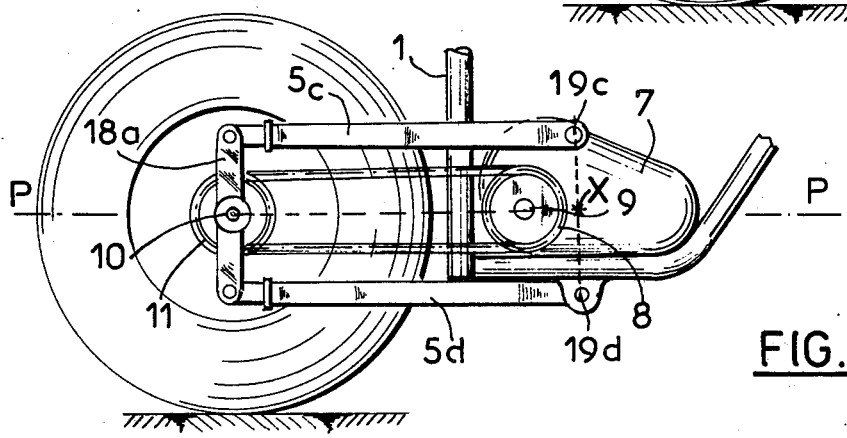
FIG. 6 represents a view similar to FIG. 1 of a third embodiment of the invention, with double offset suspension arms.

In the embodiment shown in FIG. 6, the frame 1, the rear wheel 4 and the gearbox 7 with its output pinion 8 all have the same relative disposition as in the previous cases. However no connecting arms are provided, but suspension arms 5c and 5d are provided on both sides of the wheel, the two arms on each side being disposed in a common vertical plane and being offset one above and one below the plane P—P, so that the arms 5c and 5d are both substantially parallel to the plane P—P. Each arm is mounted at one end 19c or 19d for oscillation, one on the gearbox 7 and the other on the lower part of the frame 1, while their opposite ends are articulated on a crank 18a in the middle of which the rear axle 10 is mounted. On each side of the wheel, the two suspension arms 5c and 5d, which have a suitable rigidity and consequently sizes similar to the arms 5, 5a or 5b (but which may be of reduced section since the number of arms is doubled), form with the crank 18a three sides of an articulated parallelogram whose fourth side joins the oscillation axes 19c and 19d of the two arms on the frame and gearbox, and intersects the plane P—P at a horizontal geometric axis X—X. Because of the assembly of the parallelogram, this axis X—X forms the geometric oscillation axis of the rear axle 10, even though it does not correspond physically with a component. In order to observe the conditions required by the invention, the oscillation axes 19c and 19d of the suspension arms 5c and 5d are sufficiently far forward on the gearbox 7 and the frame 1 that the axis X—X is disposed in front of the axis 9 of the driving pinion 8 formed by the gearbox output pinion.

Figure 7:
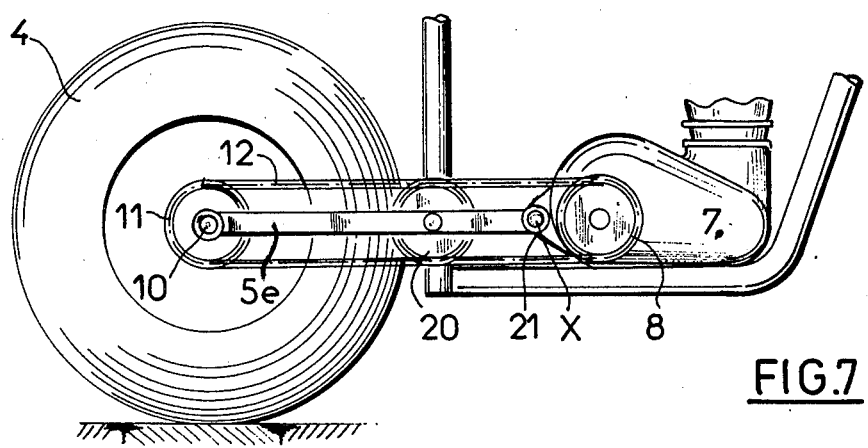
FIG. 7 represents a similar view of a fourth embodiment of the invention, with an additional transmission chain.
Figure 8:
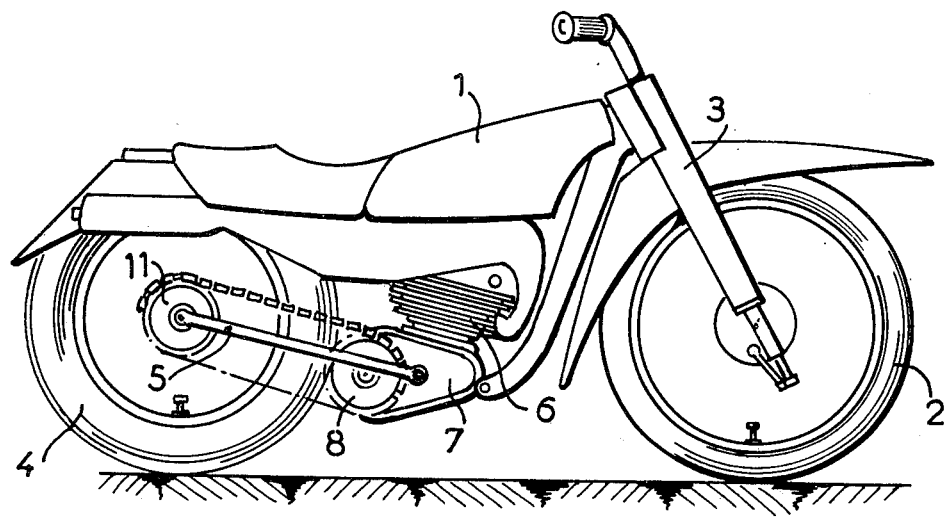
FIGS. 8 and 9 represent a motorcycle, with its suspension respectively compressed and extended, the embodiment being of the kind shown in FIGS. 1 and 2 but with the plane including the rear axle, the driving pinion axis, and the oscillation axis inclined upwardly and forwardly in self-stable position.
Figure 10:
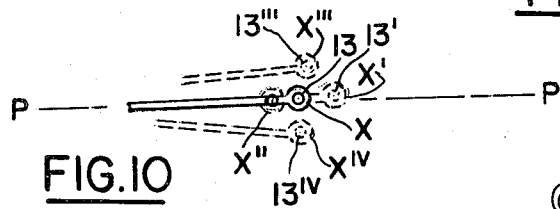
FIG. 10 represents variations in positions of the suspension pivot.
Figure 9:
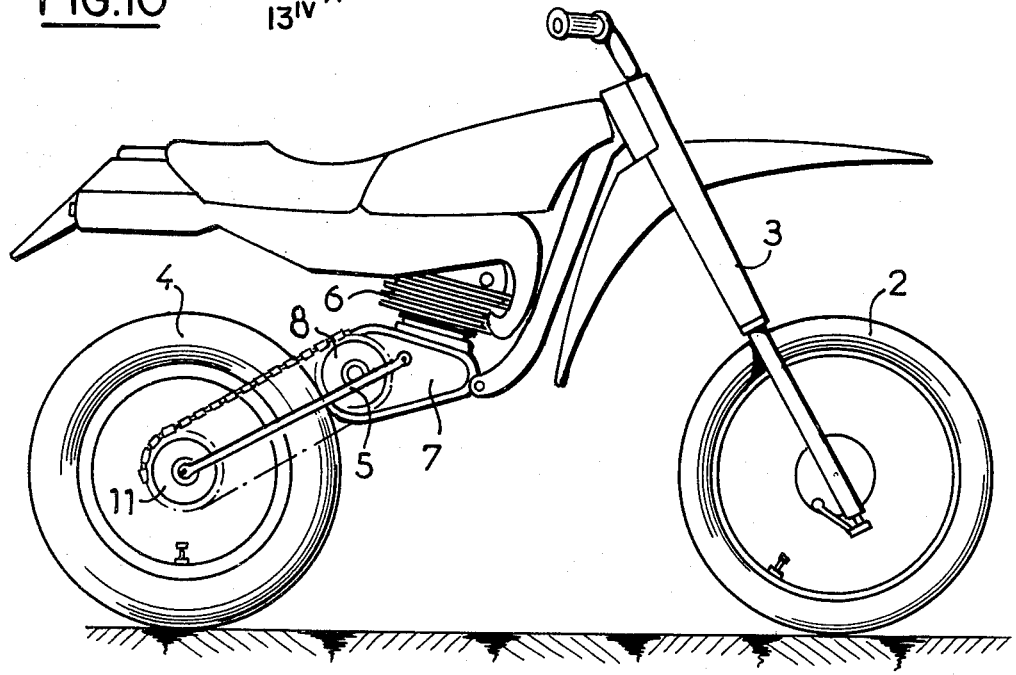

In the fourth embodiment, shown in FIG. 7, an intermediate pinion 20 is provided, mounted for idle rotation on the frame 1 to the rear of the gearbox 7 and receives the chain or toothed belt drive 12 for the rear pinion 11. The intermediate pinion serves therefore as driving pinion for the rear wheel, and to this end it is connected by a second transmission, comprising a chain or toothed belt 21, to the gearbox output pinion 8. The suspension arms 5e are similar to the arms 5 of the embodiment of FIG. 1, and have substantially the same section and rigidity, but are shorter however, given that their ends opposite to the ends carrying the rear axle 10 are pivoted on the gearbox housing on an axis X—X to the rear of the axis of the gearbox output pinion, but in front of the axis of the intermediate, driving pinion 20, so as to observe the conditions required by the invention for alignment and forward mounting of the axis X—X.

Finally, in any of the embodiments described or which can be otherwise produced, it can be arranged by way of variant that the position of the suspension pivot axis X—X can be regulated forward X' or backward X" in the plane P—P, and upward X''' or downward XIV so as to adjust the balance of the system to cater for differences in permanent loading. This regulation can be obtained for example by a set of different fixing points for the pivots 13 in the cases of FIGS. 1 to 5 and 7 or for the pivots 19c 19d in the case of FIG. 6 the chain length being also regulable for example by an eccentric and mechanism.

I claim:

1. A motorcycle comprising a frame, front and rear wheels, suspension means guiding said rear wheel for travel relative to said frame in an arc about a suspension travel axis, a motor secured to said frame, and transmission means for transmitting drive from said motor to said rear wheel, said transmission means including a driven pinion connected to the rear wheel axle, a driving pinion mounted on the frame and a flexible loop connecting said pinions whereby tension in said loop transmits drive from said driving pinion to said driven pinion, characterised in that said suspension travel axis is disposed in front of the axis of said driving pinion, whereby tension in said loop tends to reduce excursions of said rear wheel under acceleration.

2. A motorcycle as claimed in claim 1, characterized in that, in the flat road steady running condition of said suspension means, said suspension travel axis is disposed substantially in the plane intersecting the axes of said driving and driven pinions.

3. A motorcycle as claimed in claims 1 or 2, characterized in that said suspension means comprises at least one suspension arm connecting the rear wheel axle to said suspension travel axis, and resilient means acting between said frame and said at least one suspension arm.

4. A motorcycle as claimed in claims 1 or 2, characterized in that said suspension means comprises at least one suspension arm vertically off-set from the plane intersecting the axes of said driving and driven pinions, resilient means acting between said frame and said at least one suspension arm, link means connecting said suspension arm with the rear wheel axle, and at least one connecting arm connecting said rear wheel axle with said suspension travel axis, said connecting arm having a smaller cross section than said suspension arm.

5. A motorcycle as claimed in claims 1 or 2, characterized in that said suspension means comprises first and second suspension arms vertically offset respectively above and below the plane intersecting the axes of said driving and driven pinions, said suspension arms pivoting about respective axes off-set respectively above and below said suspension travel axis, and link means connecting said first and second suspension arms with the rear wheel axle.

6. A motorcycle as claimed in claim 5, characterized in that said first and second suspension arms and said link means define an articulated parallelogram.

7. A motorcycle as claimed in claim 1, characterized in that said transmission means includes a gearbox having an output shaft and said driving pinion is mounted on said output shaft.

8. A motorcycle as claimed in claim 1, characterized in that said driving and driven pinions are of substantially the same size.

9. A motorcycle as claimed in claim 1, characterized in that said suspension means comprises duplicate suspension arm means on each side of the rear wheel.

10. A motorcycle as claimed in claims 1 or 2, characterized in that the transmission means includes a gearbox output pinion and the flexible loop comprises a first flexible loop connecting the gearbox output pinion with the driving pinion for transmitting drive to the driving pinion and a second flexible loop connecting the driving pinion with the driven pinion for transmitting drive from the driving pinion to the driven pinion, an axis of the driving pinion being disposed between the gearbox output pinion and the driven pinion.

11. A motorcycle comprising a frame, front and rear wheels, suspension means guiding said rear wheel for travel relative to said frame in an arc about a suspension travel axis, a motor secured to said frame, and transmission means for transmitting drive from said motor to said rear wheel, said transmission means including a driven pinion connected to the rear wheel axle, a driving pinion and a flexible loop connecting said pinions whereby tension in said loop transmits drive from said driving pinion to said driven pinion, characterized in that said suspension travel axis is disposed in front of the axis of said driving pinion, whereby tension in said loop tends to reduce excursions of said rear wheel under acceleration, said suspension means comprising means enabling regulation of said suspension travel axis to different positions relative to said frame.

12. A motorcycle comprising a frame, front and rear wheels, suspension means guiding said rear wheel for travel relative to said frame in an arc about a suspension travel axis, a motor secured to said frame, and transmission means for transmitting drive from said motor to said rear wheel, said transmission means including a driven pinion connected to the rear wheel axle, a driving pinion and a flexible loop connecting said pinions whereby tension in said loop transmits drive from said driving pinion to said driven pinion, characterized in that said suspension travel axis is disposed in front of the axis of said driving pinion, whereby tension in said loop tends to reduce excursions of said rear wheel under acceleration, wherein said transmission means includes a gearbox having an output shaft and said driving pinion is mounted on said output shaft and brake means for said rear wheel comprising a brake disc mounted on said output shaft and friction means for braking said disc.

13. A motorcycle as claimed in claim 12 characterized in that the disc is of substantially the same diameter as said driving pinion.

* * * * *